(12) United States Patent
Kikuchi et al.

(10) Patent No.: US 11,933,235 B2
(45) Date of Patent: Mar. 19, 2024

(54) INTERNAL COMBUSTION ENGINE CONTROLLER AND METHOD FOR ESTIMATING PUMPING LOSS

(71) Applicant: TOYOTA JIDOSHA KABUSHIKI KAISHA, Aichi-ken (JP)

(72) Inventors: Shigeta Kikuchi, Toyota (JP); Tatsuya Suzuki, Toyota (JP); Hiroaki Mizoguchi, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/305,922

(22) Filed: Apr. 24, 2023

(65) Prior Publication Data

US 2023/0366359 A1 Nov. 16, 2023

(30) Foreign Application Priority Data

May 12, 2022 (JP) .................................. 2022-078849

(51) Int. Cl.
*F02D 41/00* (2006.01)
*F02B 37/18* (2006.01)

(52) U.S. Cl.
CPC .......... *F02D 41/0007* (2013.01); *F02B 37/18* (2013.01); *F02D 2200/0406* (2013.01); *F02D 2200/101* (2013.01)

(58) Field of Classification Search
CPC ............. F02B 37/18; F02D 2200/0406; F02D 2200/101
See application file for complete search history.

(56) References Cited

U.S. PATENT DOCUMENTS

| | | | | |
|---|---|---|---|---|
| 2015/0211961 A1* | 7/2015 | Ueno | ................... | G01M 15/05 73/114.22 |
| 2017/0051694 A1* | 2/2017 | Tanaka | ................... | F01M 13/00 |

FOREIGN PATENT DOCUMENTS

| | | | | |
|---|---|---|---|---|
| EP | 3103992 A1 | * | 12/2016 | ........... F01N 3/0814 |
| JP | 2007192155 A | * | 8/2007 | |
| JP | 2007192155 A | | 8/2007 | |
| JP | 2015140724 A | | 8/2015 | |
| JP | 2015206307 A | | 11/2015 | |

* cited by examiner

*Primary Examiner* — Ngoc T Nguyen
(74) *Attorney, Agent, or Firm* — HAUPTMAN HAM, LLP

(57) ABSTRACT

An internal combustion engine to which a controller is applied includes a cylinder, a turbocharger, an intake passage, a throttle valve, and an exhaust passage. The turbocharger includes a turbine wheel, a compressor wheel, and a wastegate valve. The controller executes a loss estimating process that calculates an estimated value of a pumping loss of the internal combustion engine from an intake air pressure, which is air pressure at a downstream side of the throttle valve in the intake passage, an engine speed of the internal combustion engine, and a charging pressure.

4 Claims, 3 Drawing Sheets

INTERNAL COMBUSTION ENGINE CONTROLLER AND METHOD FOR ESTIMATING PUMPING LOSS

RELATED APPLICATIONS

The present application claims priority of Japanese Application Number 2022-078849 filed on May 12, 2022, the disclosure of which is hereby incorporated by reference herein in its entirety.

BACKGROUND

1. Field

The following description relates to an internal combustion engine controller and a method for estimating pumping loss.

2. Description of Related Art

Japanese Laid-Open Patent Publication No. 2015-140724 discloses a controller applied to an internal combustion engine that includes an exhaust-driven turbocharger. The controller executes a calculation process that calculates the pumping loss of the internal combustion engine.

When the turbocharger includes a wastegate valve, the controller controls the charging pressure by adjusting the opening degree of the wastegate valve. A change in the opening degree of the wastegate valve changes a turbine upstream pressure, which is the exhaust pressure at the upstream side of where a turbine wheel of the turbocharger is arranged in an exhaust passage of the internal combustion engine. A change in the turbine upstream pressure will change the pumping loss of the internal combustion engine.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an internal combustion engine controller for an internal combustion engine is provided. The internal combustion engine includes a cylinder, a turbocharger, an intake passage through which air flows into the cylinder, a throttle valve arranged in the intake passage, and an exhaust passage through which exhaust gas discharged from the cylinder flows. The turbocharger includes a turbine wheel arranged in the exhaust passage, the turbine wheel being rotated by the flow of exhaust gas through the exhaust passage, a compressor wheel arranged at an upstream side of the throttle valve in the intake passage, the compressor wheel being rotated in synchronization with the turbine wheel, and a wastegate valve that adjusts a flow rate of the exhaust gas bypassing the turbine wheel in the exhaust passage. The internal combustion engine controller includes processing circuitry configured to execute a loss estimating process that calculates an estimated value of a pumping loss of the internal combustion engine from an intake air pressure, which is air pressure at a downstream side of the throttle valve in the intake passage, an engine speed of the internal combustion engine, and a charging pressure.

In another general aspect, a method for estimating a pumping loss in an internal combustion engine is provided. The internal combustion engine includes a cylinder, a turbocharger, an intake passage through which air flows into the cylinder, a throttle valve arranged in the intake passage, and an exhaust passage through which exhaust gas discharged from the cylinder flows. The turbocharger includes a turbine wheel arranged in the exhaust passage, the turbine wheel being rotated by the flow of exhaust gas through the exhaust passage, a compressor wheel arranged at an upstream side of the throttle valve in the intake passage, the compressor wheel being rotated in synchronization with the turbine wheel, and a wastegate valve that adjusts a flow rate of the exhaust gas bypassing the turbine wheel in the exhaust passage. The method includes executing a loss estimating process that calculates an estimated value of a pumping loss of the internal combustion engine from an intake air pressure, which is air pressure at a downstream side of the throttle valve in the intake passage, an engine speed of the internal combustion engine, and a charging pressure.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An internal combustion engine controller according to one embodiment will now be described with reference to FIGS. 1 to 4.

Figure 1:
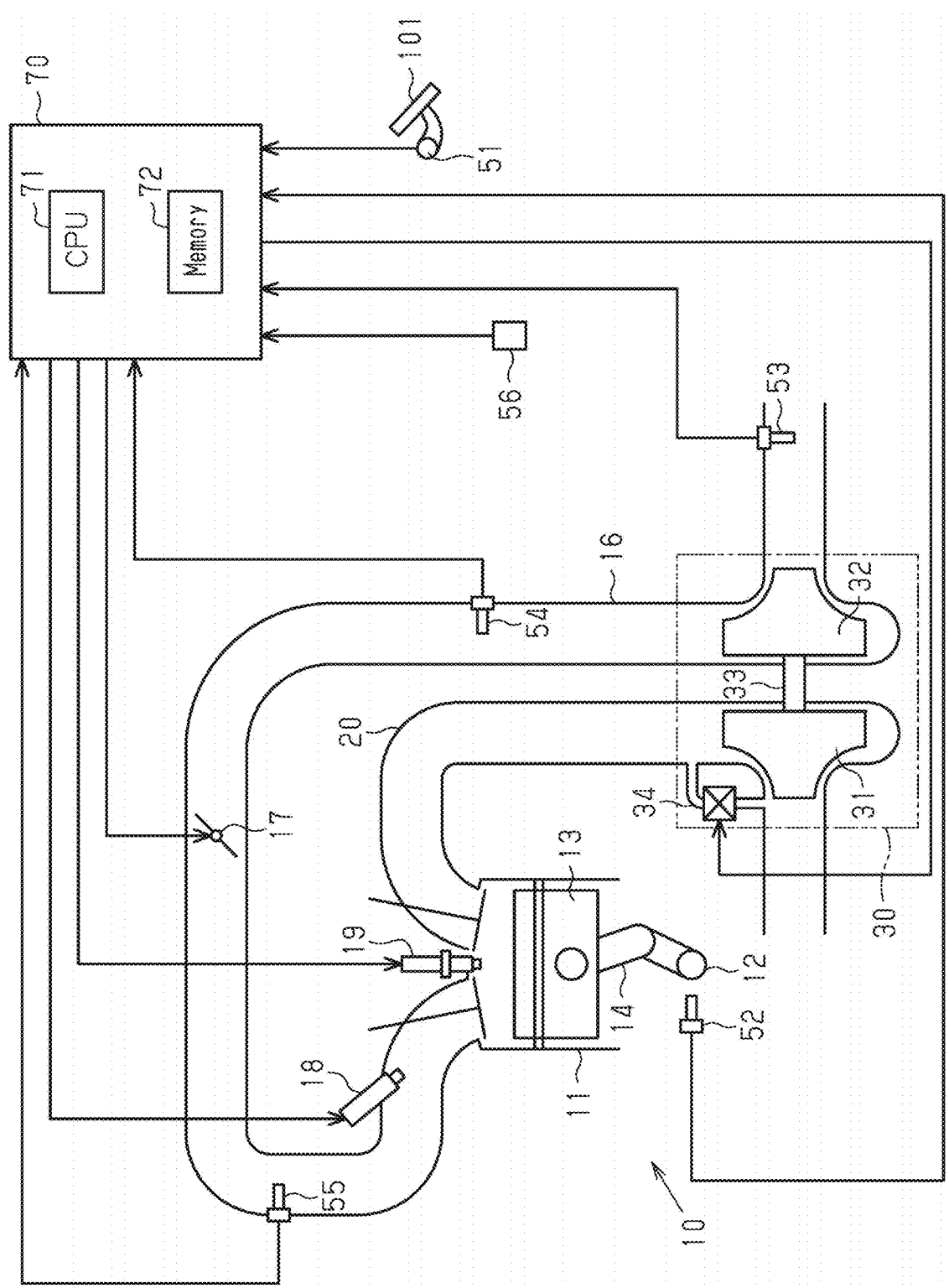
FIG. 1 is a diagram illustrating an internal combustion engine controller according to one embodiment and the configuration of an internal combustion engine to which the controller is applied.

FIG. 1 shows an internal combustion engine 10 and a controller 70 controlling the operation of the internal combustion engine 10. The controller 70 corresponds to an internal combustion engine controller.

Internal Combustion Engine

The internal combustion engine 10 includes cylinders 11 and a crankshaft 12. FIG. 1 shows one of the cylinders 11. The cylinder 11 accommodates a piston 13. The piston 13 is coupled to the crankshaft 12 by a connecting rod 14. The piston 13 reciprocates in the cylinder 11 to rotate the crankshaft 12.

The internal combustion engine 10 includes an intake passage 16 and a throttle valve 17 arranged in the intake passage 16. Air flows through the intake passage 16 into the cylinders 11. The throttle valve 17 is an electronically controlled valve that adjusts the amount of the air flowing through the intake passage 16. The flow rate of the air flowing through the intake passage 16 increases as the opening degree of the throttle valve 17 increases.

The internal combustion engine 10 includes fuel injection valves 18, ignitors 19, and an exhaust passage 20. The cylinders 11 each include a fuel injection valve 18 and an ignitor 19. The fuel injection valve 18 injects fuel into the cylinder 11. The ignitor 19 ignites and burns the mixture of air and fuel in the cylinder 11. Exhaust gas generated by the combustion of the air-fuel mixture is discharged from the cylinder 11 into the exhaust passage 20. Thus, the exhaust gas discharged from the cylinders 11 flows through the exhaust passage 20.

The internal combustion engine 10 includes an exhaust-driven turbocharger 30. The turbocharger 30 includes a turbine wheel 31, a compressor wheel 32, and a wastegate valve 34. The turbine wheel 31 is arranged in the exhaust passage 20. The compressor wheel 32 is arranged at the upstream side of the throttle valve 17 in the intake passage 16. The compressor wheel 32 is coupled to the turbine wheel 31 by a coupling shaft 33. Thus, when the flow of exhaust gas in the exhaust passage 20 rotates the turbine wheel 31, the compressor wheel 32 rotates in synchronization with the turbine wheel 31. This pressurizes the air flowing through the intake passage 16.

The wastegate valve 34 adjusts the flow rate of the exhaust gas that bypasses the turbine wheel 31. The flow rate of the exhaust gas bypassing the turbine wheel 31 increases as the opening degree of the wastegate valve 34 increases. This lowers the charging pressure produced when the turbocharger is driven.

Controller

The controller 70 receives detection signals from sensors. The sensors include, for example, a throttle sensor 51, a crank angle sensor 52, an air flowmeter 53, a charging pressure sensor 54, an intake air pressure sensor 55, and an atmospheric pressure sensor 56. The throttle sensor 51 detects the depression amount of an accelerator pedal 101. The depression amount corresponding to the detection value of the throttle sensor 51 is referred to as the throttle opening degree AC. The crank angle sensor 52 detects the rotation angle of the crankshaft 12. The speed of the crankshaft 12 corresponding to the detection value of the crank angle sensor 52 is referred to as the engine speed NE. The air flowmeter 53 detects the flow rate of air flowing through the intake passage 16. The flow rate of the air corresponding to the detection value of the air flowmeter 53 is referred to as the intake air amount GA. The charging pressure sensor 54 detects the air pressure at a portion between the downstream side of the compressor wheel 32 and the upstream side of the throttle valve 17. The air pressure corresponding to the detection value of the charging pressure sensor 54 is referred to as the charging pressure PB. The intake air pressure sensor 55 detects the air pressure at the downstream side of the throttle valve 17 in the intake passage 16. The air pressure corresponding to the detection value of the intake air pressure sensor 55 is referred to as the intake air pressure PM. The atmospheric pressure sensor 56 detects the atmospheric pressure. The atmospheric pressure corresponding to the detection value of the atmospheric pressure sensor 56 is referred to as the atmospheric pressure KPA.

The controller 70 controls the opening degree of the throttle valve 17, the fuel injection amount of the fuel injection valves 18, the ignition timing of the ignitors 19, and the opening degree of the wastegate valve 34 based on the detection signals of the sensors described above.

The controller 70 includes a central processing unit (CPU) 71 and a memory 72. The memory 72 stores various control programs executed by the CPU 71.

Figure 2:
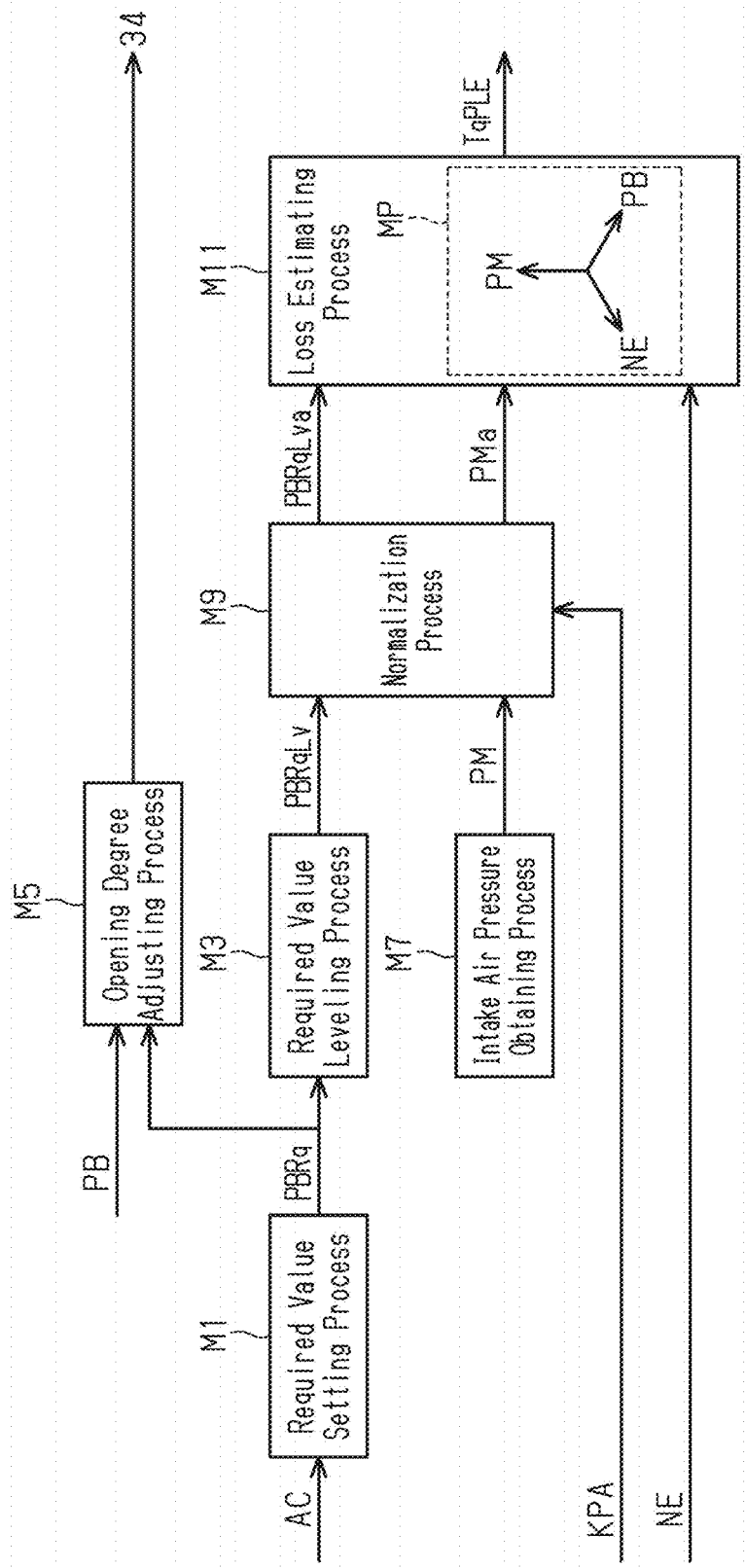
FIG. 2 is a block diagram showing various types of processes executed by a central processing unit (CPU) of the controller.

As shown in FIG. 2, the CPU 71 executes the control programs to perform a required value setting process M1, a required value leveling process M3, an opening degree adjusting process M5, an intake air pressure obtaining process M7, a normalization process M9, and a loss estimating process M11.

In the required value setting process M1, the CPU 71 sets a required charging pressure PBRq, which is the required value of the charging pressure PB. Specifically, the CPU 71, in the required value setting process M1, sets the required charging pressure PBRq to a greater value as the required torque output of the internal combustion engine 10 increases. When a driver of a vehicle depresses the accelerator pedal 101, a larger throttle opening degree AC increases the required torque output of the internal combustion engine 10. Thus, the CPU 71 sets, for example, the required charging pressure PBRq to a greater value as the throttle opening degree AC increases.

In the required value leveling process M3, the CPU 71 calculates a smoothed required charging pressure value PBRqLv, which is a value obtained by leveling the required charging pressures PBRq. For example, the CPU 71, in the required value leveling process M3, sets the smoothed required charging pressure value PBRqLv to the moving average of a time series of consecutive required charging pressures PBRq.

In the opening degree adjusting process M5, the CPU 71 adjusts the opening degree of the wastegate valve 34 based on the required charging pressure PBRq. For example, the CPU 71 operates the wastegate valve 34 and adjusts the opening degree so that the opening degree decreases as the required charging pressure PBRq increases.

In the intake air pressure obtaining process M7, the CPU 71 obtains the intake air pressure PM.

In the normalization process M9, the CPU 71 normalizes the intake air pressure PM and the smoothed required charging pressure value PBRqLv under the atmospheric pressure KPA. Specifically, the CPU 71 normalizes the intake air pressure PM by dividing the intake air pressure PM by the atmospheric pressure KPA. The intake air pressure normalized under the atmospheric pressure KPA is referred to as the normalized intake air pressure PMa. The CPU 71 also normalizes the smoothed required charging pressure value PBRqLv by dividing the smoothed required charging pressure value PBRqLv by the atmospheric pressure KPA. The smoothed required charging pressure value normalized under the atmospheric pressure KPA is referred to as the normalized smoothed required charging pressure value PBRqLva.

In the loss estimating process M11, the CPU 71 calculates a pumping loss estimated value TqPLE of the internal combustion engine 10 based on the intake air pressure PM, the engine speed NE, and the charging pressure PB. In the present embodiment, the CPU 71 calculates the pumping loss estimated value TqPLE based on the normalized intake air pressure PMa, the engine speed NE, and the normalized smoothed required charging pressure value PBRqLva. The CPU 71, in the loss estimating process M11, uses a map MP to obtain the pumping loss estimated value TqPLE.

The map MP is used to obtain a value corresponding to the intake air pressure, the engine speed, and the charging pressure as the pumping loss estimated value TqPLE. In the map MP, the pumping loss estimated value TqPLE increases as the intake air pressure decreases, the pumping loss estimated value TqPLE increases as the engine speed increases, and the pumping loss estimated value TqPLE increases as the charging pressure increases.

In the present embodiment, the CPU 71 uses the map MP to obtain a value corresponding to the normalized intake air pressure PMa, the engine speed NE, and the normalized smoothed required charging pressure value PBRqLva. The calculated value is the pumping loss estimated value TqPLE.

Figure 3:
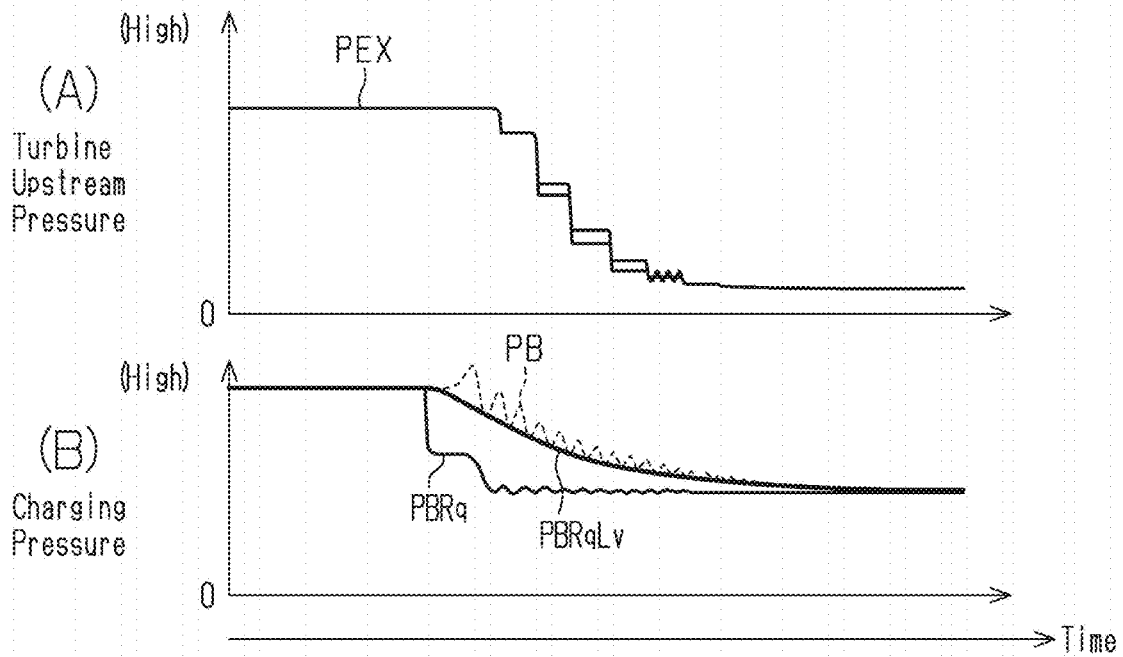
FIG. 3 is a timing chart showing the correlation between the charging pressure and the turbine upstream pressure.

The relationship between a turbine upstream pressure PEX and the charging pressure will now be described with reference to FIG. 3. The turbine upstream pressure PEX is the exhaust pressure at the upstream side of the turbine wheel 31 in the exhaust passage 20. In FIG. 3, section (A) shows the turbine upstream pressure PEX, and section (B) shows the charging pressure. In section (B) of FIG. 3, the fine solid line indicates the required charging pressure PBRq, the bold solid line indicates the smoothed required charging pressure value PBRqLv, and the broken line indicates the charging pressure PB, which is a detection value of the charging pressure sensor 54. As shown in FIG. 3, the turbine upstream pressure PEX decreases as the smoothed required charging pressure value PBRqLv decreases. In this manner, FIG. 3 shows the correlation between the charging pressure and the turbine upstream pressure PEX.

Figure 4:
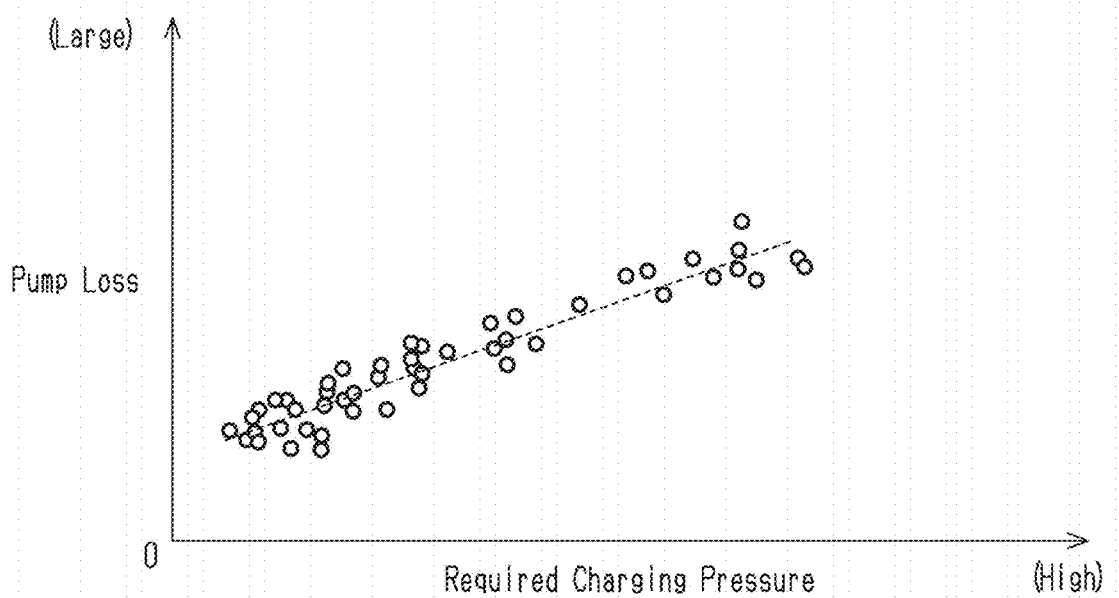
FIG. 4 is a graph showing the relationship between the required charging pressure and the pumping loss of an internal combustion engine.

FIG. 4 is a graph showing the pumping loss TqPL when changing the required charging pressure PBRq on the condition that the intake air pressure PM is fixed. As shown in FIG. 4, the pumping loss TqPL increases as the required charging pressure PBRq increases.

Operation and Advantages of Present Embodiment (1) It is understood based on experiments and simulations that there is a correlation between the charging pressure and the turbine upstream pressure PEX, which is the exhaust pressure at the upstream side of the turbine wheel 31 in the exhaust passage 20. That is, when the charging pressure changes as the opening degree of the wastegate valve 34 changes, the turbine upstream pressure PEX will also change.

When the turbine upstream pressure PEX changes as the required charging pressure PBRq changes, the pumping loss TqPL will also change. As shown in FIG. 4, the pumping loss TqPL increases as the required charging pressure PBRq increases.

In the present embodiment, the controller 70 calculates the pumping loss estimated value TqPLE based on the required charging pressure PBRq in addition to the intake air pressure and the engine speed. Since a change in the turbine upstream pressure PEX will indicate that the required charging pressure PBRq has changed, the pumping loss estimated value TqPLE will also change. Thus, the controller 70 improves the estimation accuracy of the pumping loss.

(2) When the throttle opening degree AC suddenly changes, the required charging pressure PBRq will be changed greatly. Section (B) of FIG. 3 shows the required charging pressure PBRq when the throttle opening degree AC suddenly decreases. In such a case, the required charging pressure PBRq may deviate from the actual charging pressure. Under a situation in which the required charging pressure PBRq is deviated from the actual charging pressure, if the pumping loss estimated value TqPLE is calculated from the required charging pressure PBRq, the estimation of the pumping loss will not be accurate.

As shown in section (B) of FIG. 3, the smoothed required charging pressure value PBRqLv changes gradually even when the throttle opening degree AC suddenly changes. That is, even when the throttle opening degree AC suddenly changes, deviation of the smoothed required charging pressure value PBRqLv from the actual charging pressure will be limited.

Further, when the required charging pressure PBRq suddenly changes, the charging pressure PB, which is the detection value of the charging pressure sensor 54, may fluctuate as shown by the broken line in section (B) of FIG. 3.

In this case, the controller 70 calculates the pumping loss estimated value TqPLE based on the smoothed required charging pressure value PBRqLv obtained by leveling the required charging pressure PBRq. Thus, the controller 70 maintains accuracy in the estimation of the pumping loss when the required charging pressure PBRq suddenly changes.

(3) The controller 70 uses the normalized intake air pressure PMa, which is the intake air pressure normalized under the atmospheric pressure KPA, to calculate the pumping loss estimated value TqPLE. The controller 70 also uses the normalized smoothed required charging pressure value PBRqLva, which is the smoothed required charging pressure value PBRqLv normalized under the atmospheric pressure KPA, to calculate the pumping loss estimated value TqPLE. Thus, the controller 70 maintains accuracy in the estimation of the pumping loss resulting from a change in the atmospheric pressure KPA.

(4) The controller 70 calculates a value that reflects a change in the turbine upstream pressure PEX as the pumping loss estimated value TqPLE without using a sensor that detects the turbine upstream pressure PEX.

Modification

The above-described embodiment may be modified as follows. The above-described embodiment and the following modifications can be combined if the combined modifications remain technically consistent with each other.

The calculation of the pumping loss estimated value TqPLE does not have to use the intake air pressure normalized under the atmospheric pressure KPA. That is, the controller 70 may use the intake air pressure PM instead of the normalized intake air pressure PMa to calculate the pumping loss estimated value TqPLE.

The calculation of the pumping loss estimated value TqPLE does not have to use the smoothed required charging pressure value PBRqLv normalized under the atmospheric pressure KPA. That is, the controller 70 may use the smoothed required charging pressure value PBRqLv instead of the normalized smoothed required charging pressure value PBRqLva to calculate the pumping loss estimated value TqPLE.

The controller 70 may calculate the pumping loss estimated value TqPLE using the charging pressure PB based on a detection value of the charging pressure sensor 54 instead of the required charging pressure PBRq. In this case, a smoothed value of the charging pressure PB may be used.

The map MP does not need to be used if the pumping loss estimated value TqPLE is calculated from the charging pressure, the engine speed, and the charging pressure. For example, the controller 70 calculates a base value of the pumping loss based on the charging pressure and the engine speed. Further, the controller 70 calculates a corrected value of the pumping loss based on the charging pressure. In this case, the controller 70 calculates the corrected value that is greater as the charging pressure PB becomes higher. Then, the controller 70 calculates the sum of the base value and the corrected value as the pumping loss estimated value TqPLE. The pumping loss estimated value TqPLE may be calculated in this manner in accordance with a change in the turbine upstream pressure PEX.

In the intake air pressure obtaining process M7, the CPU 71 obtains the intake air pressure PM based on a detection value of the intake air pressure sensor 55. Instead, in the intake air pressure obtaining process M7, the CPU 71 may obtain the intake air pressure PM based on an estimated value that is derived from a physical model of the intake system of the internal combustion engine 10.

The controller 70 is not limited to a device that includes a CPU and ROM and executes software processing. That is, the controller 70 may be modified to have any one of the following configurations (a) to (c).

(a) The controller 70 includes a processor that executes various types of processes according to a computer program. The processor includes a CPU and memory such as RAM and ROM. The memory stores program codes or instructions configured to cause the CPU to execute processes. The memory, or computer readable media, include any type of media that are accessible by general-purpose computers and dedicated computers.

(b) The controller 70 includes one or more dedicated hardware circuits that executes various types of processes. Examples of the dedicated hardware circuits include an application-specific integrated circuit such as ASIC or FPGA. ASIC is an acronym for an application-specific integrated circuit, and FPGA is an acronym for a field programmable gate array.

(c) The controller 70 includes a processor that executes part of various types of processes according to a computer program and a dedicated hardware circuit that executes the remaining part of the various types of processes.

In other words, the above processes may be executed by processing circuitry that includes at least one of a processor and a dedicated hardware circuit. A plurality of processors and/or a plurality of dedicated hardware circuits may be included in the processing circuitry.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An internal combustion engine controller for an internal combustion engine, the internal combustion engine including a cylinder, a turbocharger, an intake passage through which air flows into the cylinder, a throttle valve arranged in the intake passage, and an exhaust passage through which exhaust gas discharged from the cylinder flows, the turbocharger including a turbine wheel arranged in the exhaust passage, the turbine wheel being rotated by the flow of exhaust gas through the exhaust passage, a compressor wheel arranged at an upstream side of the throttle valve in the intake passage, the compressor wheel being rotated in synchronization with the turbine wheel, and a wastegate valve that adjusts a flow rate of the exhaust gas bypassing the turbine wheel in the exhaust passage, the internal combustion engine controller comprising:

processing circuitry configured to execute a loss estimating process that calculates an estimated value of a pumping loss of the internal combustion engine from an intake air pressure, which is air pressure at a downstream side of the throttle valve in the intake passage, an engine speed of the internal combustion engine, and a charging pressure, wherein the processing circuitry is configured to execute a required value setting process in order to set a required charging pressure that is a required value of the charging pressure, the required charging pressure being increased as a required value of torque output from the internal combustion engine increases, the processing circuitry is configured to execute an opening degree adjusting process in order to adjust an opening degree of the wastegate valve, the opening degree of the wastegate valve being decreased as the required charging pressure increases, the processing circuitry is configured to execute a leveling process in order to calculate a smoothed required charging pressure value that is obtained by leveling the required charging pressure, and the charging pressure used in the loss estimating process is the smoothed required charging pressure value.

2. The internal combustion engine controller according to claim 1, wherein the intake air pressure used in the loss estimating process is normalized under atmospheric pressure.

3. A method for estimating a pumping loss in an internal combustion engine, the internal combustion engine including a cylinder, a turbocharger, an intake passage through which air flows into the cylinder, a throttle valve arranged in the intake passage, and an exhaust passage through which exhaust gas discharged from the cylinder flows, the turbocharger including a turbine wheel arranged in the exhaust passage, the turbine wheel being rotated by the flow of exhaust gas through the exhaust passage, a compressor wheel arranged at an upstream side of the throttle valve in the intake passage, the compressor wheel being rotated in synchronization with the turbine wheel, and a wastegate valve that adjusts a flow rate of the exhaust gas bypassing the turbine wheel in the exhaust passage, the method comprising:

executing a loss estimating process that calculates an estimated value of a pumping loss of the internal combustion engine from an intake air pressure, which is air pressure at a downstream side of the throttle valve in the intake passage, an engine speed of the internal combustion engine, and a charging pressure;

executing a required value setting process in order to set a required charging pressure that is a required value of the charging pressure, the required charging pressure being increased as a required value of torque output from the internal combustion engine increases;

executing an opening degree adjusting process in order to adjust an opening degree of the wastegate valve, the opening degree of the wastegate valve being decreased as the required charging pressure increases; and executing a leveling process in order to calculate a smoothed required charging pressure value that is obtained by leveling the required charging pressure, wherein the charging pressure used in the loss estimating process is the smoothed required charging pressure value.

4. The method according to claim 3, wherein the intake air pressure used in the loss estimating process is normalized under atmospheric pressure.

\* \* \* \* \*